July 21, 1931.    F. W. McCONNEL    1,815,572
INTERNAL COMBUSTION ENGINE
Filed March 9, 1928    3 Sheets-Sheet 1
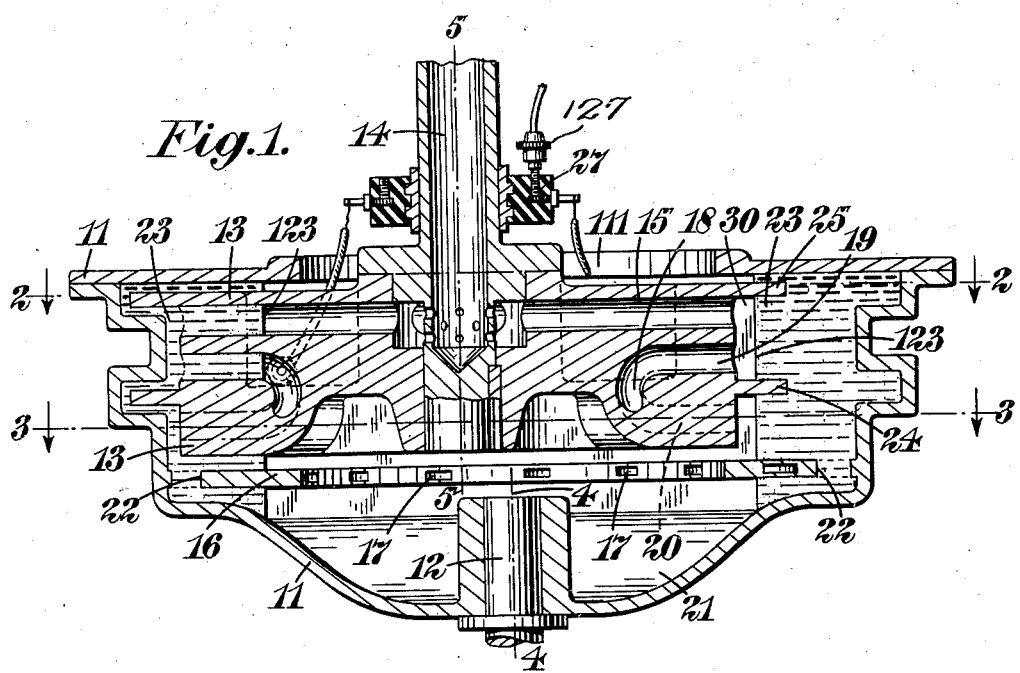
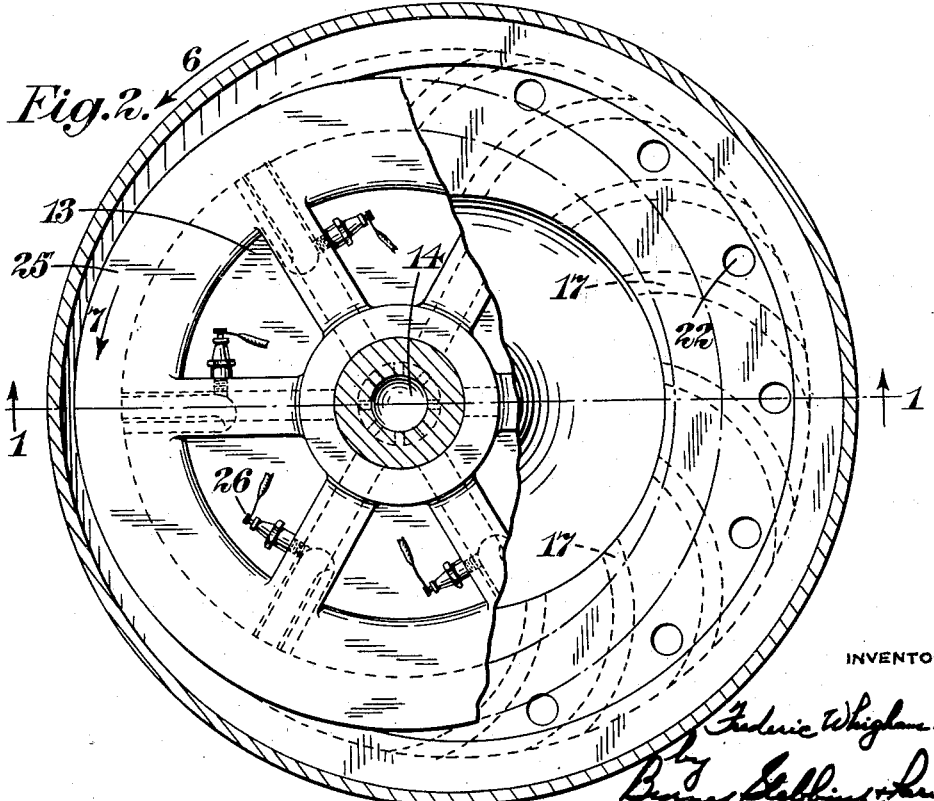
INVENTOR July 21, 1931.  F. W. McCONNEL  1,815,572
INTERNAL COMBUSTION ENGINE
Filed March 9, 1928  3 Sheets-Sheet 2
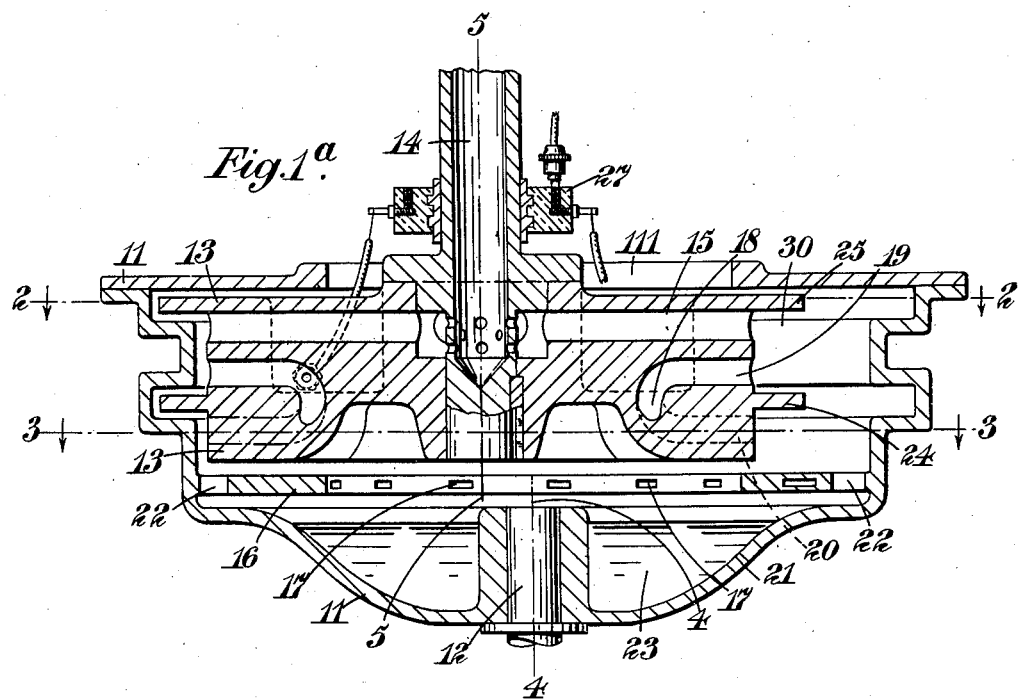

July 21, 1931. F. W. McCONNEL 1,815,572
INTERNAL COMBUSTION ENGINE
Filed March 9, 1928 3 Sheets-Sheet 3
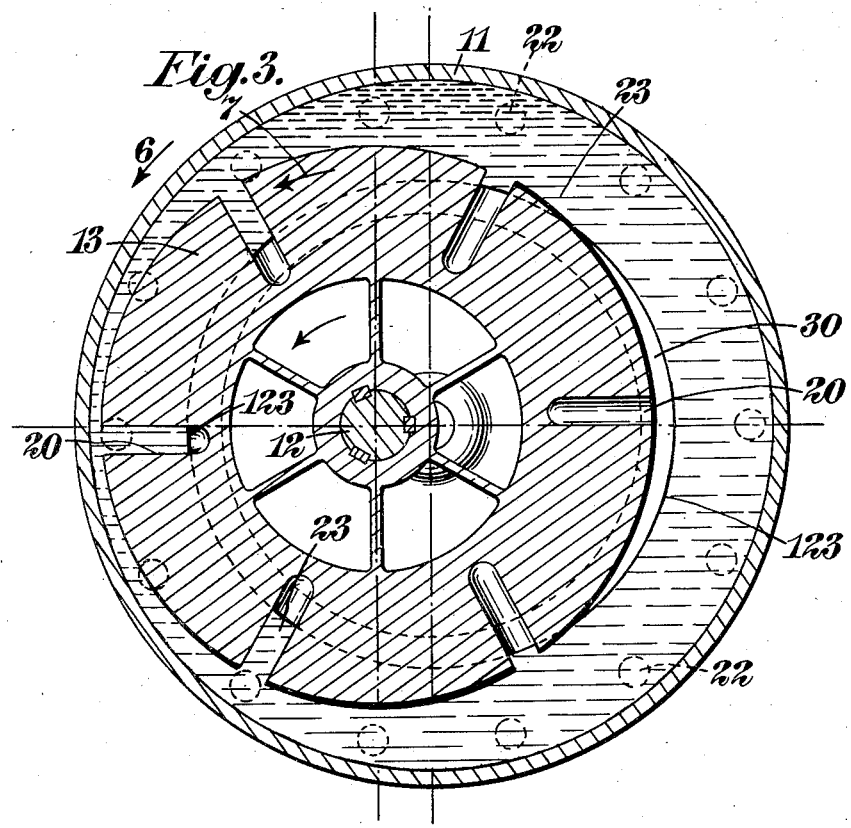
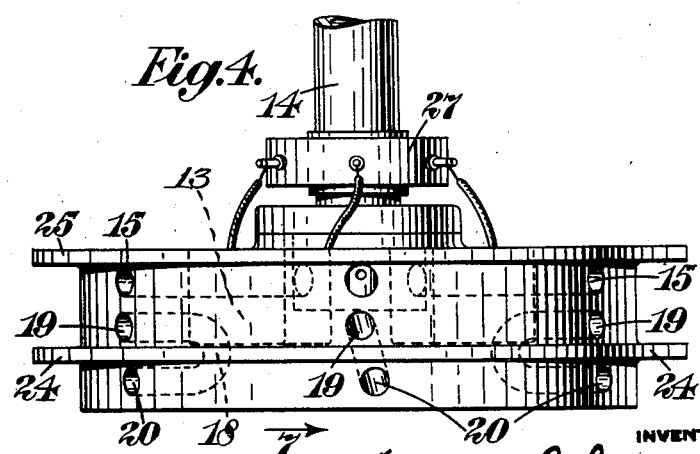

Patented July 21, 1931

1,815,572

UNITED STATES PATENT OFFICE

FREDERIC WHIGHAM McCONNEL, OF MARTLEY, ENGLAND

INTERNAL COMBUSTION ENGINE

Application filed March 9, 1928, Serial No. 260,472, and in Great Britain August 31, 1927.

This invention relates to internal-combustion rotary engines.

An internal-combustion rotary engine, according to the present invention comprises a rotatable casing, a rotatable member in the casing and rotatable about an axis of rotation that is parallel with and eccentric to that of the casing, a plurality of two-legged combustion chambers in the rotatable member which extend outwardly with the inner ends of the legs of each combustion chamber connected together and with the outer ends open at the periphery of the rotatable member, the outer ends of the combustion chamber being in two planes of rotation about the axis of the said rotatable member with the outer end of one leg of each combustion chamber in one such plane of rotation and the other leg of each combustion chamber in the other plane which is parallel to the former, and the outlet end of each combustion chamber being in angular advance of the inlet end thereof in the direction of rotation of the aforesaid rotatable member, an annular web provided on and extending from the rotatable member between the said open ends of each combustion chamber and a liquid lining in the rotatable casing, which lining is penetrated by the whole outer circumference of the said annular web and by the side of a cylinder that is swept out by the said outer ends of the combustion chambers.

An engine according to this invention is diagrammatically represented in the accompanying drawings, in which—

Figure 1 is a vertical central section of the engine on line 1—1 of Figure 2 showing the material forming the liquid lining in the running position.

Figure 1a is a similar view showing the location of the material for the liquid lining at the position of rest.

Figure 2 is a sectional plan on line 2—2 of Figure 1 with a part of the rotatable member broken away;

Figure 3 is a sectional plan on the line 3—3 of Figure 1; and

Figure 4 is an elevation of the rotatable member.

Like reference-numerals indicate like parts throughout the drawings.

Referring to the drawings, the rotatable casing 11, which in the present instance is circular, is carried upon a vertical shaft 12, the axis of the casing and shaft being the line 4—4 in Figure 1 and the direction of rotation of the casing being indicated by the arrow 6, and the rotatable member 13 is arranged within the casing 11 and is supported by a vertical hollow shaft 14 extending through an opening 111 in the casing, no stuffing box, as will hereafter be seen, being needed in the opening. The axis of rotation of the shaft 14 and member 13 is line 5, 5, Figure 1, and the direction of rotation of the member is indicated by the arrow 7. The hollow shaft 14 serves as a supply conduit for fuel and radial passages 15 in the rotatable member lead from the hollow shaft to the circumference of the rotatable member and deliver thereat the fuel. The fuel may be a liquid or gaseous fuel or a fuel such as pulverized coal.

The rotatable casing 11 has an inwardly-projecting annular flange 16 that is perpendicular to the axis of rotation 4, 4 and in which there are provided passages 17 extending from the inner part of the flange to the exterior of the casing. These passages are provided to convey exhaust gases or waste products out of the engine, and are preferably inclined or of curved form such as is shown in Figure 2 to present their outward ends rearwardly in relation to the direction of rotation of the casing, (shown by the arrow 6 in Figure 2) in order that the exhaust gases shall assist or cause rotation of the casing 11.

In the circumference of the rotatable member 13 there are combustion chambers 18 of two-legged form, (see in particular Figures 1 and 4) the inlet leg 19 and the outlet leg 20 of each combustion chamber being connected together at their inner ends and open at their outer ends at the circumference of the rotatable member. The inlet legs 19 of all the combustion chambers are in one plane of rotation about the axis of the rotatable member 13, and the outlet legs 20 are in another similar plane of rotation parallel to the former.

Each of the combustion chambers is also formed in such a manner that the mouth of the outlet leg 20 is in angular advance (see Figure 4) of the mouth of the inlet leg 19 in the direction of rotation of the rotatable member 13, which direction is shown by the arrow in Figure 4.

A body of liquid or a body of solid material such as lead that will become liquid at the running temperature of the engine is disposed, when the engine is stationary, in a part of the casing 11 such as the trough 21 formed therein. When the casing 11 is rotated the liquid from the trough will move radially outwards by centrifugal action, passing through apertures 22 in the flange 16 and will form a lining 23 for the inside of the rotatable casing. The central bore of this lining is indicated at 123 in Figures 1 and 3 of the drawings. The quantity of liquid supplied to the trough must be such as to ensure that the liquid lining, when the engine is in action, is penetrated at one side only of the bore by the side of a cylinder that is swept out by the open ends of the legs 19 and 20 of the combustion chambers. Thus, during a portion of each revolution of the member 13 the mouths of the legs of each combustion chamber enter and leave the liquid lining and during the passage of each chamber through the lining, the liquid first rises into and then descends out of the combustion chamber, thus serving as a piston in each leg thereof.

An annular web 24 is provided on and extends from the rotatable member 13 between the sets of inlet legs 19 and outlet legs 20 of the combustion chambers and towards the rotatable casing 11 to such a distance that the whole outer circumference of the web is always immersed in the liquid lining 23 when the engine is running. Thus all passage external to a combustion chamber between the inlet leg 19 and the outlet leg 20 is closed in order to ensure that the fuel shall be supplied first to the inlet legs 19 and to prevent the fuel passing directly from the radial passages 15 to the exhaust passages 17, and to prevent the return of exhaust towards the supply passages 15.

An annular flange 25 is also provided on and extended from the rotatable member 13 towards the casing to such a distance that the whole outer circumference of the flange is always immersed in the liquid lining 23 when the engine is running. This flange 25 is so situated as to form a closure for an outlet which would otherwise exist between the rotatable member 13 and the central bore 123 of the liquid lining and through the opening 111 in the casing 11, which would, if not closed, permit the fuel to escape.

There are sparking-plugs 26 in the combustion chambers electrically connected to a distributing contact-ring 27 carried by the hollow shaft 14 and electrically fed by a brush 127 from a suitable source.

The outer casing 11 must first be rotated by a starting device such as an electric motor until the liquid lining is set up by centrifugal action, the material of the lining if normally solid such as lead, having initially been sufficiently heated to be in a liquid condition. Next or simultaneously the rotatable member must be spun so that the open ends of the combustion chambers enter and leave the liquid lining as hereinbefore described. The mouth of the outlet leg of each combustion chamber is an angular advance of the mouth of the inlet leg, and, therefore, the mouth of the outlet leg will leave the liquid and thus become opened to permit exhaust gases to escape from the combustion chamber before the mouth of the inlet leg becomes unsealed by leaving the liquid lining. The exhaust gases pass from the combustion chamber into the casing 11 and pass out of the latter by way of the passages 17 leading from the interior to the exterior of the casing 11. When the exhaust gases have escaped from the combustion chamber or after their escape has begun, but before its completion, the mouth of the inlet leg leaves the liquid lining and the fuel supplied to the space 30 through radial passages 15, some of which are at all times open, enters into the inlet leg. Then, the open end of the outlet leg of the combustion chamber again enters the liquid lining and immediately thereafter the open end of the inlet leg also enters the lining, and the liquid rises in both the legs of the combustion chamber and compresses the charge therein. When the liquid reaches about its highest level in the legs of the combustion chamber the charge is ignited by means of the sparking-plug 26. The effort thus produced continues the rotation of the casing 11 and of the rotatable member 13 so that the relative rotation between them continues in the direction in which it was originally set up. The liquid level in the legs of the combustion chamber falls and eventually the open end of the outlet leg leaves the liquid lining and again permits the exhaust gases to escape in the manner hereinbefore described.

Thereafter, the open end of the inlet leg leaves the lining and the combustion chamber is again charged with fuel as before, and the cycle of operation in the chamber is repeated, and it occurs in the different combustion chambers in succession in the order in which their mouths enter the lining, the cycle in each chamber being what is known as the "two-stroke" cycle.

Preferably, the angular velocity of the rotatable casing and of the rotatable member should be the same. The frictional drag of the liquid lining may, however, be utilized to rotate the casing.

Suitable means may be provided for cooling either the casing or the rotatable member or both of these parts.

I claim:—

1. An internal combustion rotary engine comprising a rotatable casing, a rotatable member in the casing and rotatable about an axis of rotation that is parallel with and eccentric to that of the casing, a plurality of two-legged combustion chambers in the rotatable member which extend outwardly with the inner ends of the legs of each combustion chamber connected together and with the outer ends open at the periphery of the rotatable member, the outer ends of the combustion chambers being in two planes of rotation about the axis of the said rotatable member with the outer end of one leg of each combustion chamber in one such plane of rotation and the other leg of each combustion chamber in the other plane which is parallel to the former, and the outlet end of each combustion chamber being in angular advance of the inlet end thereof in the direction of rotation of the aforesaid rotatable member, an annular web provided on and extending from the rotatable member between the said open ends of each combustion chamber and a liquid lining in the rotatable casing, which lining is continuously penetrated by the whole outer circumference of the said annular web and is periodically penetrated by the said outer ends of the combustion chambers in rotation.

2. An internal combustion rotary engine comprising a rotatable casing having an open end, a rotatable member in the casing and rotatable about an axis of rotation that is parallel with and eccentric to that of the casing, a shaft for supporting the rotatable member extending through said open end of the casing, a plurality of two-legged combustion chambers in the rotatable member which extend outwardly with the inner ends of the legs of each combustion chamber connected together and with the outer ends open at the periphery of the rotatable member, the outer ends of the combustion chambers being in two planes of rotation about the axis of the said rotatable member with the outer end of one leg of each combustion chamber in one such plane of rotation and the other leg of each combustion chamber in the other plane which is parallel to the former, and the outlet end of each combustion chamber being in angular advance of the inlet end thereof in the direction of rotation of the aforesaid rotatable member, an annular web provided on and extending from the rotatable member between the said open ends of each combustion chamber, a liquid lining in the rotatable casing, which lining is continuously penetrated by the whole outer circumference of the said annular web and is periodically penetrated by the said outer ends of the combustion chambers in rotation, and an annular flange extending from said rotatable member at right angles to the axis of rotation thereof and penetrating the said liquid lining in order to prevent the escape of fuel from the outer circumference of the rotatable member through said opening in the rotatable casing.

3. An internal combustion rotary engine comprising a rotatable casing having an open end, a rotatable member in the casing and rotatable about an axis of rotation that is parallel with and eccentric to that of the casing, a plurality of combustion chambers in the rotatable member, which extend outwardly with their outer ends open at the periphery of the rotatable member and their inner ends closed, a liquid lining in the rotatable casing, which lining is penetrated periodically at one part by the said outer ends of the combustion chambers in rotation, a hollow shaft for supporting the rotatable member extending through said open end of the casing, said hollow shaft serving as a supply conduit for the fuel radial conduits from said shaft to the circumference of the rotatable member adjacent to the open ends of the combustion chambers to deliver the fuel there, and an annular flange provided on and extending from the rotatable member at right-angles to its axis of rotation and continuously penetrating the liquid lining at the whole of the outer circumference for preventing the escape of fuel from the outer open ends of the combustion chambers and the radial conduits through the said opening in the casing.

4. In an internal combustion rotary engine the combination of a rotatable casing, a rotatable member in the casing and rotatable about an axis of rotation that is parallel with and eccentric to that of the casing, a plurality of combustion chambers in the rotatable member which extend outwardly, and are open at their outer ends, a liquid lining in the rotatable casing, which lining is penetrated periodically at a part of its surface by the outer ends of the combustion chambers in rotation, and an inwardly extending annular flange on the rotatable casing which flange is perpendicular to the axis of rotation and that has passages therein for exhaust gases, which passages are open at one end at the exterior of the casing and at the other end at a part of the flange that is inwardly beyond and free of the liquid lining, said passages being formed to present their outlet ends rearwardly in relation to the direction of rotation of the casing.

In testimony whereof I affix my signature.

FREDERIC WHIGHAM McCONNEL.